US010817168B1

United States Patent
Lewis et al.

(10) Patent No.: US 10,817,168 B1
(45) Date of Patent: Oct. 27, 2020

(54) NAVIGATION OF A LIST OF CONTENT SHARING PLATFORM MEDIA ITEMS ON A CLIENT DEVICE VIA GESTURE CONTROLS AND CONTEXTUAL SYNCHRONIZATION

(71) Applicant: Google Inc., Mountain View, CA (US)

(72) Inventors: Justin Lewis, Marina del Rey, CA (US); Jonathan W. Ray, Venice, CA (US)

(73) Assignee: GOOGLE LLC, Mountain View, CA (US)

( * ) Notice: Subject to any disclaimer, the term of this patent is extended or adjusted under 35 U.S.C. 154(b) by 813 days.

(21) Appl. No.: 15/408,623

(22) Filed: Jan. 18, 2017

Related U.S. Application Data

(63) Continuation of application No. 13/943,976, filed on Jul. 17, 2013, now Pat. No. 9,588,647.

(51) Int. Cl.
*G06F 3/048* (2013.01)
*G06F 3/0488* (2013.01)
*H04M 1/725* (2006.01)
*G06F 3/0481* (2013.01)

(52) U.S. Cl.
CPC ...... *G06F 3/04883* (2013.01); *G06F 3/04817* (2013.01); *H04M 1/72522* (2013.01)

(58) Field of Classification Search
CPC ...... G06F 3/0488; G06F 3/165; G06F 3/0482; G06F 3/167; G06F 16/4387; G06F 16/639; G06F 3/04883; G06F 3/048; G06F 3/017
See application file for complete search history.

(56) References Cited

U.S. PATENT DOCUMENTS

| 6,639,584 | B1* | 10/2003 | Li | G06F 3/04883 178/18.01 |
|---|---|---|---|---|
| 2006/0197753 | A1* | 9/2006 | Hotelling | G06F 1/1626 345/173 |
| 2009/0024923 | A1 | 1/2009 | Hartwig | |
| 2012/0311444 | A1* | 12/2012 | Chaudhri | G06F 3/04883 715/716 |

(Continued)

OTHER PUBLICATIONS

USPTO, Office Action for U.S. Appl. No. 13/943,976, dated May 19, 2015.
USPTO, Final Office Action for U.S. Appl. No. 13/943,976, dated Dec. 2, 2015.

(Continued)

*Primary Examiner* — Phuong H Nguyen
(74) *Attorney, Agent, or Firm* — Lowenstein Sandler LLP

(57) ABSTRACT

Navigation of a list of content sharing platform media items on a client device via gesture controls and contextual synchronization is disclosed. A method includes providing a playlist for playback in a playback portion of a user interface (UI) of an application, wherein the playlist comprises a collection of media items streamable to the application, receiving an indication of a gesture made by a user with respect to the playlist, identifying a location associated with the gesture on the UI, determining that the location associated with the gesture is in an area covering the playback portion of the UI, in response to determining that the gesture is a swipe left gesture, navigating media items of the playlist in a forward direction, in response to determining that the gesture is a swipe right gesture, navigating media items of the playlist in a backward direction, and updating a viewing state associated.

17 Claims, 11 Drawing Sheets

(56) References Cited

U.S. PATENT DOCUMENTS

2014/0108929 A1 4/2014 Garmark et al.
2014/0115114 A1* 4/2014 Garmark ................ H04L 65/60
709/219

OTHER PUBLICATIONS

USPTO, Office Action for U.S. Appl. No. 13/943,976, dated Apr. 26, 2016.
USPTO, Notice of Allowance for U.S. Appl. No. 13/943,976, dated Oct. 20, 2016.
Wikipedia, "Multi-touch", 9 pages, [retrieved from the internet on Feb. 6, 2017].
Wikipedia, "Playlist", 4 pages, [retrieved from the internet on Feb. 6, 2017].
Wikipedia, "YouTube", 36 pages, [retrieved from the internet on Feb. 6, 2017].
Wikipedia, "Drag and drop", 4 pages, [retrieved from the internet on Feb. 6, 2017].
Wikipedia, "Internet traffic", 7 pages, [retrieved from the internet on Feb. 6, 2017].
Wikipedia, "List of video hosting services", 10 pages, [retrieved from the internet on Feb. 6, 2017].
Wikipedia, "Mobile device", 4 pages, [retrieved from the internet on Feb. 6, 2017].
Wikipedia, "Pointing device gesture", 9 pages, [retrieved from the internet on Feb. 6, 2017].
Wikipedia, "Tablet computer", 9 pages, [retrieved from the internet on Feb. 6, 2017].
Wikipedia, "Video hosting service", 3 pages, [retrieved from the internet on Feb. 6, 2017].

* cited by examiner

300

Provide a playlist for playback in a portion of a UI of an application executed by an electronic device, the playlist including a list of media items provided by a content sharing platform for playback on the electronic device
310

Receive indication of a gesture made by the user of the electronic device with respect to the portion of the UI associated with the playback of the playlist
320

Determine a navigation action associated with the gesture defined by the received indication
330

Navigate the playlist according to the determined navigation action
340

Update a user state associated with the playlist based on the navigating, the user state maintained by the content sharing platform
350

```
Receive data of a playlist for use in playback of the playlist by an application
associated with a content sharing platform providing media items of the playlist
                                                                            410
```

```
Generate UI for playlist, where a portion of the UI dedicated to a media item player
                        to playback the playlist
                                                                            420
```

```
Receive indication of a gesture may by the user of the electronic device with respect
        to the portion of the UI associated with the playback of the playlist
                                                                            430
```

```
Determine a navigation action associated with the gesture defined by the received
                                indication
                                                                            440
```

```
Request additional data from the content sharing platform in order to navigate the
            playlist according to the determined navigation action
                                                                            450
```

```
Update a user state associated with the playlist based on the navigating, the user
            state maintained by the content sharing platform
                                                                            460
```

FIG. 4

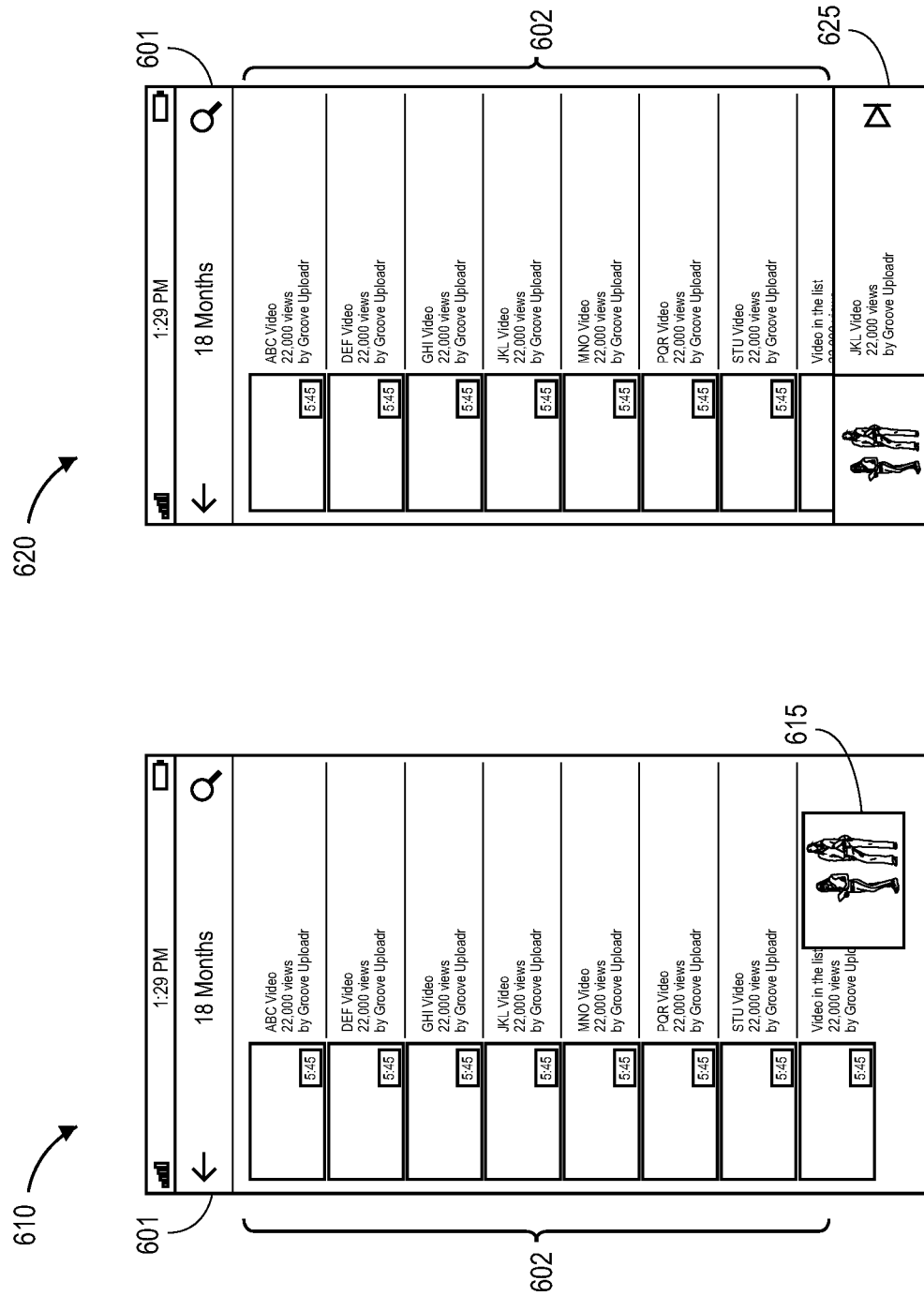

US 10,817,168 B1

NAVIGATION OF A LIST OF CONTENT SHARING PLATFORM MEDIA ITEMS ON A CLIENT DEVICE VIA GESTURE CONTROLS AND CONTEXTUAL SYNCHRONIZATION

REFERENCE TO RELATED APPLICATION

This application is a continuation of U.S. patent application Ser. No. 13/943,976, filed on Jul. 17, 2013, the entirety of which is incorporated herein by reference.

TECHNICAL FIELD

This disclosure relates to the field of content sharing platforms and, in particular, to navigation of a list of content sharing platform media items on a client device via gesture controls and contextual synchronization.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

Currently, users are spending increased amounts of time on content sharing platforms. Similar to a television or radio experience, users typically prefer to watch or listen to content without interruptions or having to decide what to watch next. Some content sharing platforms allow users to create playlists that allow the user to create a list of favorite media items to automatically play without interruption.

Video and other media consumption on content sharing platforms is rapidly moving to mobile devices. However, navigating playlists on mobile devices is difficult because the user interface is stripped down to the bare essentials so that the UI can fit on a smaller screen. This can result in an unsatisfactory user experience, causing users to reduce their interactions with the mobile platform provided by the content sharing platform.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for navigation of a list of content sharing platform media items on a client device via gesture controls and contextual synchronization is disclosed. The method includes providing, by an electronic device, a playlist for playback in a portion of a user interface (UI) of an application executed on the electronic device, wherein the playlist comprises a collection of media items streamed to the application on the electronic device. The method further include receiving an indication of a gesture made by a user of the electronic device with respect to the portion of the UI associated with the playback of the playlist and navigating media items of the playlist based on the received indication. The method also includes updating a viewing state associated with the playlist based on the navigating, the viewing state maintained for the user.

In one implementation, the method further comprises receiving a request for the playlist from the user, the request sent via a mobile application of a content sharing platform executing on the electronic device. In addition, the another portion of the UI displays a list of the media items in the playlist. Furthermore, the gestures of the user received in the another portion of the UI may provide a different navigation result than the gestures made by the user in the portion of the UI associated with the playback of the playlist. The viewing state associated with the playlist may comprise a most recent location within the playlist that the user has viewed, and is used by a content sharing platform to return the user to the most recent location when the user accesses the playlist on a device that is different than the electronic device.

In some implementations, when the gesture is a swipe left gesture, the navigating the media items comprises one of proceeding to a next media item in the playlist, fast forwarding a current media item in the playback, or skipping a promotion in the playback. Furthermore, in other implementations, when the gesture is a swipe right gesture, the navigating the media items comprises one of proceeding to a prior media item in the playlist or rewinding a current media item in the playback. In addition, when the gesture is a swipe up gesture, the navigating the media items may comprise one of liking a current media item in the playback, increasing a volume of the playback, increasing a playback speed of the playback, or maximizing the portion of the UI within the display of the application on the electronic device.

In addition, when the gesture is a swipe down gesture, the navigating the media items comprises one of disliking a current media item in the playback, decreasing a volume of the playback, decreasing a playback speed of the playback, or minimizing the portion of the UI within the display of the application on the electronic device. In one implementation, when the gesture is a swipe in a circle gesture, the navigating the media items comprises one of returning to a beginning of a current media item in the playback, returning to a first media item in the playlist for the playback, or replaying a section of the current media item in the playback.

In another implementation, when the gesture is a hover gesture, the navigating the media items comprises one of showing a list of thumbnails and links to each media item in the playlist, or showing other hidden controls for the playlist. Additionally, when the gesture is a shaking gesture, the navigating the media items comprises proceeding to a media item that is randomly-selected from the playlist.

In additional implementations, computing devices for performing the operations of the above described implementations are also disclosed. Additionally, in implementations of the disclosure, a computer readable storage media stores methods for performing the operations of the above described implementations.

BRIEF DESCRIPTION OF THE DRAWINGS

The present disclosure is illustrated by way of example, and not by way of limitation, in the figures of the accompanying drawings.

FIG. 3 is a flow diagram illustrating a method for navigation of a list of content sharing platform media items on a client device via gesture controls and contextual synchronization, according to some implementations of the disclosure.

FIG. 4 is a flow diagram illustrating another method for navigation of a list of content sharing platform media items on a client device via gesture controls and contextual synchronization, according to some implementations of the disclosure.

FIGS. 6A through 6D are example screenshots illustrating different options for placement of a media item player on a playlist UI according to implementations of the disclosure.

DETAILED DESCRIPTION

Implementations are described for navigation of a list of content sharing platform media items on a client device via gesture controls and contextual synchronization. In implementations of the disclosure, a list of media items (e.g., a playlist) generated by a content sharing platform may be navigated via gesture controls that are relative to a media item player portion of a user interface (UI) for the playlist provided by a client device. Regardless of a location of the media item player within the UI, user gesture controls detected with respect to the media item player portion of the UI result in navigation actions within the playlist. Gestures made by the user outside of the media item player portion of the UI (e.g., in another portion of the UI than the media item player) may result in a different behavior and/or different navigational result than that same gesture made inside the media item player portion of the UI.

In some implementations, a viewing state of the playlist while the user is viewing the playlist may also be observed and maintained by the content sharing platform. This viewing state may be utilized to provide contextual synchronization of the playlist at the client device. The viewing state may represent a location in the playlist that the user is watching, and may be represented as a combination of a playlist identifier (ID), a media item ID, and an index of the media item within the playlist (in case there are multiple occurrences of the same media item in a playlist). When the user is watching a playlist, the viewing state of the playlist may be periodically updated to reflect where the user is in the viewing experience. When the user opens the playlist on a different device (e.g., the client device), the playlist can resume where the user last left off.

Implementations of the disclosure have a different layer of granularity than previous solutions for navigating video playlists. Previously, content sharing platforms providing mobile video platforms have not implemented playlists for video content, except for long form episodic shows (e.g., media items with a large amount of content, such as television episodes lasting approximately 20 minutes or more). In the cases of long form video content, gesture controls are not implemented for moving between video content because users typically skip inside the video more frequently than to jumping from video to video. In addition, navigating video playlists on mobile devices is difficult because the UI is generally stripped down to a minimum so that the UI can fit on a smaller screen. By implementing methods for using gestures to control video playlists, the user experience can be improved and, thereby, cause users to interact more frequently with the content sharing platform.

Figure 1:
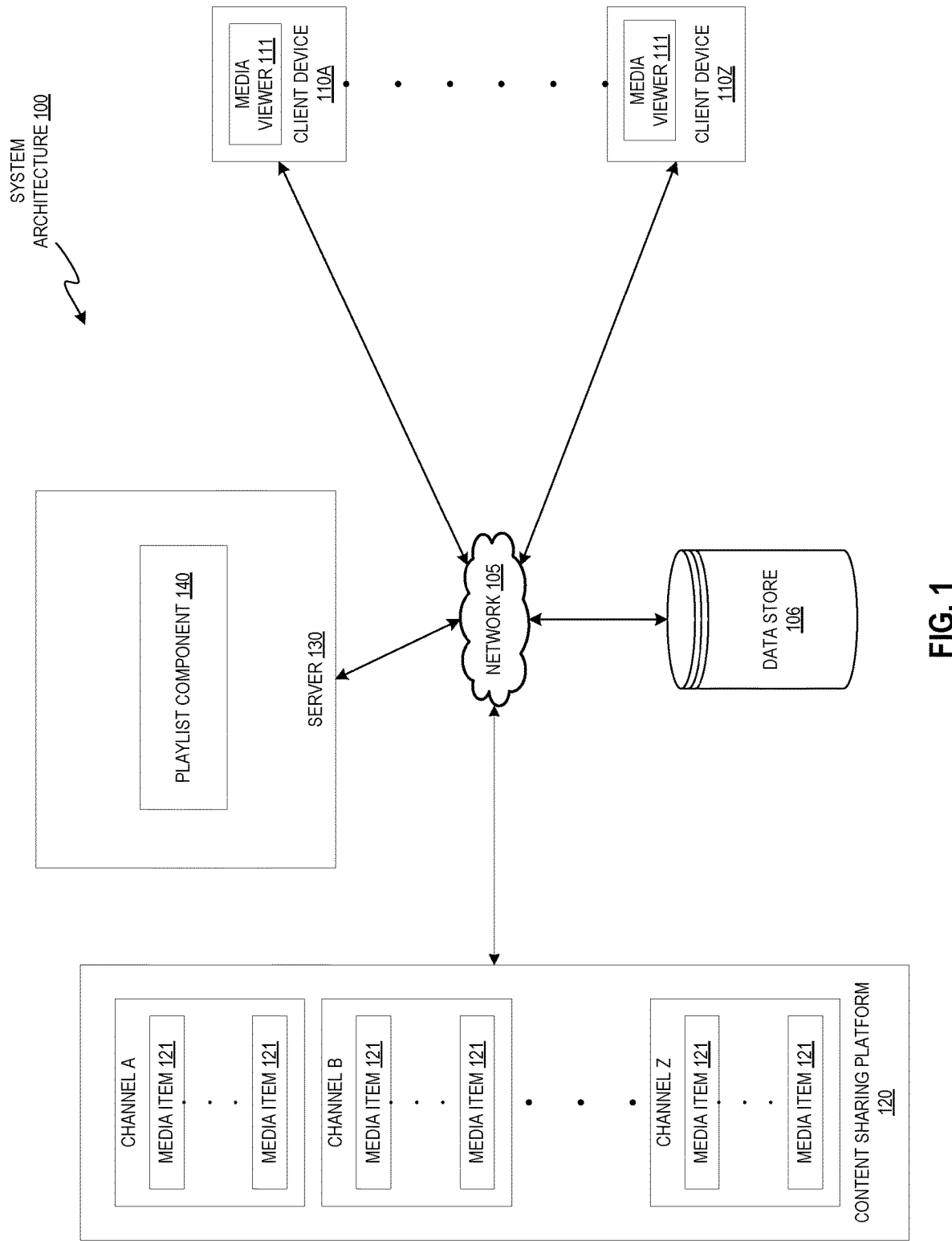
FIG. 1 illustrates an example system architecture, in accordance with one implementation of the disclosure.

FIG. 1 illustrates an example system architecture 100, in accordance with one implementation of the disclosure, for navigation of a list of content sharing platform media items on a client device via gesture controls and contextual synchronization. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consumer, upload, search for, approve of ("like"), dislike, and/or comment on media items. The content sharing platform 120 may also include a website (e.g., a webpage) that may be used to provide a user with access to the media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user.

Each channel may include one or more media items 121. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a media item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a playlist component 140. In one implementation, the playlist component 140 provides navigation of a list of content sharing platform media items 121 on a client device 110A-110Z via gesture controls and contextual synchronization. In other implementations, the media viewer 111 provided by content sharing platform 120 for viewing of media items 121 streamed by content sharing platform 120, operates together with the playlist engine 140 to provide navigation of a list of content sharing platform media on a user device via gesture controls and contextual synchronization. The list of content sharing platform media items 121 may be referred to herein as a "playlist". A playlist may include a list of media items 121 that can be played (e.g., streamed) in sequential or shuffled order on the content sharing platform. Further description of the playlist component 140, the media viewer 111, and their specific functions are described in more detail below with respect to FIG. 2.

Although implementations of the disclosure are discussed in terms of content sharing platforms and navigation of playlists of the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
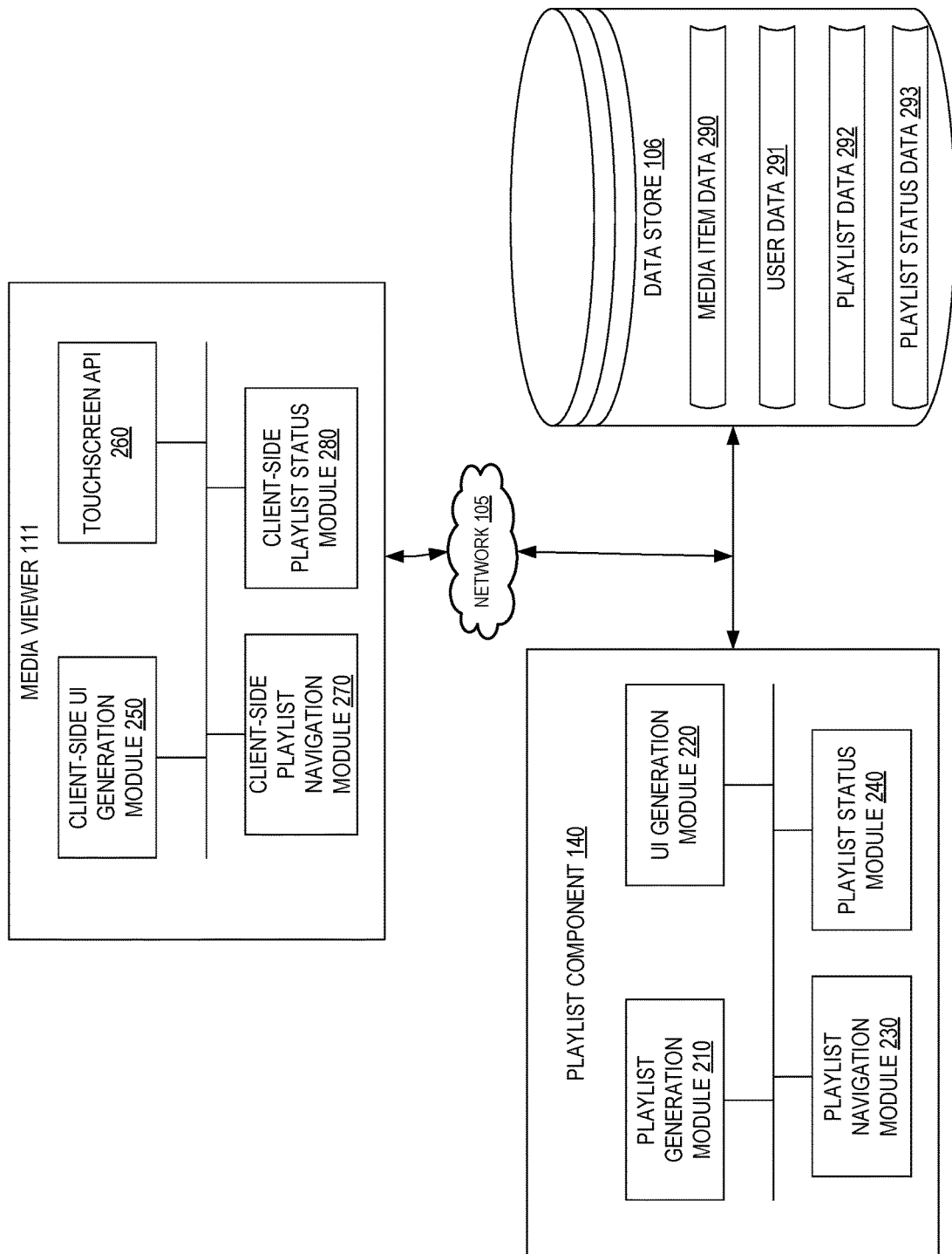
FIG. 2 is a block diagram illustrating a playlist component and a media viewer in accordance with one implementation of the disclosure.

FIG. 2 is a block diagram illustrating a playlist component 140 and a media viewer 111 in accordance with one implementation of the disclosure. In one implementation, the playlist component 140 includes a playlist generation module 210, a user interface (UI) generation module 220, a playlist navigation module 230, and a playlist status module 240. More or less components may be included in the playlist component 140 without loss of generality. For example, two of the modules may be combined into a single module, or one of the modules may be divided into two or more modules. In one implementation, one or more of the modules may reside on different computing devices (e.g., different server computers).

The media viewer 111 may be part of a client device, such as client device 110a-110Z of FIG. 1. Media viewer 111 may include a client-side UI generation module 250, a touchscreen application programming interface (API) 260, client-side playlist navigation module 270, and a client-side playlist status module 280. More or less components may be included in the media viewer 111 without loss of generality. For example, two of the modules may be combined into a single module, or one of the modules may be divided into two or more modules.

The playlist component 140 and the media viewer 111 are communicatively coupled to each other and to the data store 106. For example, the playlist component 140 and the media viewer 111 may be coupled to each other and the data store 106 via a network (e.g., via network 105 as illustrated in FIG. 1). In another example, the playlist component 140 may be coupled directly to a server where the playlist component 140 resides (e.g., may be directly coupled to server 130). The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes media item data 290, user data 291, playlist data 292, and playlist status data 293.

As discussed above, the playlist component 140 provides navigation of a list of content sharing platform media items on a client device via gesture controls and contextual synchronization. In one implementation, playlist generation module 210 accesses media item data 290 and user data 291 to generate a playlist of media items for consumption by users of the content sharing platform 120. The generated playlist, and/or metadata associated with the generated playlist, may be stored in playlist data 292 of data store 106.

UI generation module 220 may populate the playlist data for presentation in a UI generated for the playlist. In one implementation, the client-side UI generation module 250 receives playlist UI data from the UI generation module 220 for use in generating the UI for display at the client device. The UI for a playlist may be presented in a variety of formats, depending on a type of client device and/or the actions of the user on the client device. In one implementation, the UI for a playlist includes a media item player and an information window. The media item player displays playback of a current selected media item of the playlist. The information window may display information regarding the current selected media item shown in the media item player and/or a list of the media items in the playlist, for example.

In some implementations, the media item player may remain visible, at least in a small portion of the UI, while the user navigates to other menus of the media viewer separate from the playlist. In addition, the media item player may change positions within the UI dependent on the user's actions. For example, if the user leaves a playlist menu to search for additional media items or other content of the content sharing platform, the media item player may be minimized to a smaller player viewable at a bottom portion of the UI, or as a floating window of the UI, that remains visible while the user is performing his or her search and reviewing results of the search. The media item player may move around the UI depending on the actions taken by the user and the menus viewed. In other implementations, the media item player may be maximized to consume the entire viewable space of the UI.

In implementations of the disclosure, the playlist may be navigated via gesture controls that are relative to the media item player portion of the UI. Regardless of a location of the media item player within the UI, any gesture controls detected with respect to the media item player portion of the UI may operate to navigate the playlist. Gestures made by the user outside of the media item player (e.g., in another portion of the UI than the media item player window) may result in a different behavior of the media viewer 111 and/or different navigational results than those same gestures made inside the media item player portion of the UI.

In one implementation, the client device may provide a touchscreen API 260 to enable the media viewer 111 to enable gesture control recognition by the media viewer 111. The touchscreen API 260 may translate gestures made on a touchscreen of the client device into data signals that are understandable to the media viewer 111. A client-side playlist navigation module 270 may receive information regarding a received gesture from the touchscreen API 260, and determine whether the gesture was made in relation to a portion of the UI associated with the media item player for the playlist. If so, the client-side navigation module 270 may navigate the playlist according to the received gesture.

Table 1 below provides examples of possible gestures and navigation actions resulting from the associated gestures for navigating a playlist. Implementations of the disclosure are not limited to the examples provide in Table 1, and may include additional gestures and/or resulting navigational controls.

TABLE 1

| Gesture | Resulting Navigation Action |
|---|---|
| Swipe Left | -Go to next media item in the playlist<br>-Fast forward current selection<br>-Skip promotion |
| Swipe Right | -Go back to previous media item in the playlist<br>-Rewind current selection |
| Swipe Up | -Indicate favorability of the current selection<br>-Increase volume<br>-Increase playback speed<br>-Maximize media item player from minimized state |
| Swipe Down | -Indicate disfavor with the current selection<br>-Decrease volume<br>-Decrease playback speed ("slow motion")<br>-Minimize the media item player<br>-Close the media item player |
| Swipe in a Circle | -Return to beginning of the current selection<br>-Return to beginning of the playlist<br>-Instant replay |
| Hover at Top/Bottom of Media Item Player | -Show a list of thumbnails and links to each media item in the playlist<br>-Show other hidden controls |
| Shake Device | -Show a random media item from the playlist |

In one implementation, once the user gesture is recognized in relation to the media item player for the playlist and the resulting navigational action is determined, the client-side playlist navigation module 270 may communicate with the playlist navigation module 230 of the playlist component 140 on the server side of the content sharing platform to cause the navigation of the playlist to occur. For example, if a user swipes left on the media item player of a playlist, and the resulting navigational action is to skip to the next media item in the playlist, the client-side playlist navigation module 270 may determine the next item in the playlist (e.g., based on metadata of the playlist previously sent to the media viewer 111), and request this next item from the content sharing platform via the playlist navigation module 230. In some implementations, beginning portions of each media item in a playlist may be pre-cached at the client device. When the media item is selected or navigated to, the pre-cached data may be used to initially begin playback of the media item while a request to stream the media item is processed by the media viewer 111 and playlist component 140.

In other implementations, the information regarding a received gesture from the touchscreen API 260 may be provided directly to the playlist navigation module 230 of the playlist component 140 in order to allow the playlist navigation module 230 to decipher the gesture, determine the resulting playlist navigation action, and cause the navigation to occur at the media item player.

In some implementations, a viewing state of the playlist while viewing the playlist may be observed and maintained by the content sharing platform. This viewing state may be utilized to provide contextual synchronization of a playlist at the client device. The viewing state may represent where in the playlist he or she is watching, and may be represented as a combination of the playlist identifier (ID), the media item ID, and the index of the media item within the playlist (in case there are multiple occurrences of the same media item in a playlist). A location within the media item may also be stored as part of the viewing state of the playlist. In some implementations, the viewing state is stored in playlist status data 293 of data store 106, and may be keyed by a user ID, playlist ID pair.

When the user is watching a playlist, the playlist status module 240 or the client-side playlist status module 280 (depending on where the user is watching the playlist) may periodically update the viewing state of the playlist to reflect where the user is in the viewing experience. When the user opens the playlist on a different device (e.g., the client device), the playlist can resume where the user last left off. For example, when loading a playlist at the media viewer 111, the client-side playlist status module 280 may request a user status for the playlist from the playlist status data 293 using a user ID, playlist ID pair for a query to the data store 106. In other implementations, the playlist status module 240 may perform this viewing state check when the playlist is requested from the media viewer 11, and prior to sending playlist data back to the media viewer.

In one implementation, a "Send to My Device" feature may be enabled that allows a user to send a playlist and the viewing state associated with the playlist as part of a payload to an indicated client device. The client device may then play the media item in the playlist as indicated by the received viewing state in the payload.

In some implementations, the navigation of a list of content sharing platform media items on a client device via gesture controls and contextual synchronization described above is performed in the context of a video playlist streaming to a mobile device that is executing a content sharing platform application specifically designed for playback of the video playlist.

FIG. 3 is a flow diagram illustrating a method 300 for navigation of a list of content sharing platform media items on a client device via gesture controls and contextual synchronization, according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by playlist component 140, as shown in FIGS. 1 and 2.

Referring to FIG. 3, at block 310, method 300 begins at block 310 when a playlist is provided for playback in a portion of a UI of an application executed by an electronic device. In one implementation, the playlist includes a list of media items provided by a content sharing platform for playback on the electronic device. Then, at block 320, an indication of a gesture made by a user of the application on the electronic device is received. The gesture is made in relation to the portion of the UI associated with the playback of the playlist. In one implementation, a touchscreen API is provided to the application to enable the application to detect and identify gestures made by a user on the touchscreen of the electronic device.

At block 330, a navigation action is determined that is associated with the gesture defined by the received indication. In one implementation, an association of playlist media player window gestures to navigation actions may be maintained by the content sharing platform. For example, Table 1 discussed above details various user gestures and resulting navigation actions. Subsequently, ay block 340, the playlist is navigated according to the determined navigation action. Lastly, at block 350, a viewing state associated with the playlist is updated based on the navigating. In one implementation, the viewing state is maintained by the content sharing platform.

FIG. 4 is a flow diagram illustrating another method 400 for navigation of a list of content sharing platform media items on a client device via gesture controls and contextual synchronization, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by media viewer 111 as shown in FIGS. 1 and 2.

Referring to FIG. 4, at block 410, method 400 begins at block 410 when a data of a playlist is received for use in for playback of the playlist by an application associated with a content sharing platform providing the media items of the playlist. At block 420, a UI is generated at the media viewer for the playlist. A portion of the UI is dedicated to a media item player to playback the playlist. Then, at block 430, an indication of a gesture made by a user of the application on the electronic device is received. The gesture is made in relation to the portion of the UI associated with the playback of the playlist. In one implementation, a touchscreen API is provided to the application to enable the application to detect and identify gestures made by a user on the touchscreen of the electronic device.

At block 440, a navigation action is determined that is associated with the gesture defined by the received indication. In one implementation, an association of playlist media player window gestures to navigation actions may be maintained by the content sharing platform. For example, Table 1 discussed above details various user gestures and resulting navigation actions. Subsequently, ay block 450, additional data is requested from the content sharing platform in order to navigate the playlist according to the determined navigation action. For example, if the navigation action is to skip to the next media item in the playlist, the media viewer may request streaming of the next media item from the content sharing platform. Lastly, at block 460, a viewing state associated with the playlist is updated based on the navigating. In one implementation, the viewing state is maintained by the content sharing platform.

Figures 5A, 5B:
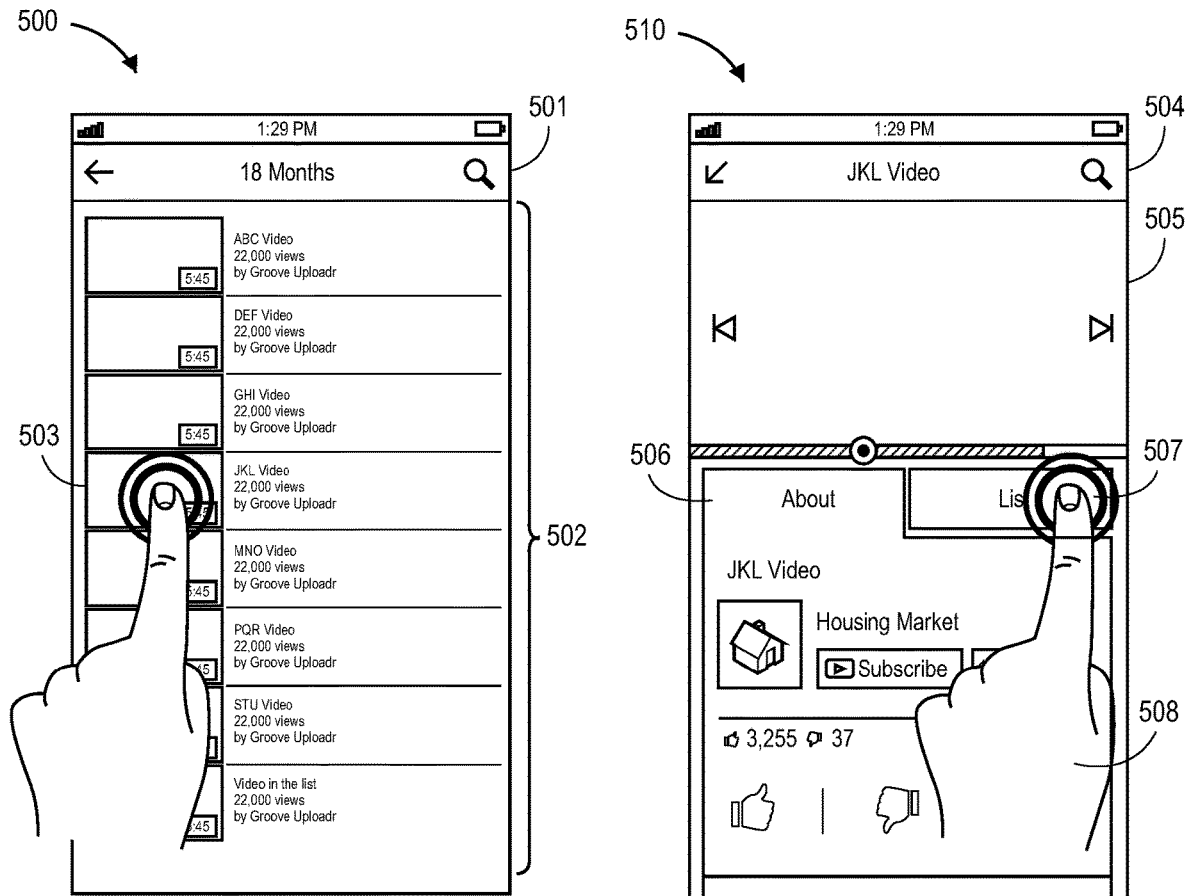
FIGS. 5A through 5G are example screenshots illustrating a UI for navigating a list of content sharing platform media items on a client device via gesture controls and contextual synchronization.

FIGS. 5A through 5G are example screenshots illustrating a UI for navigating a list of content sharing platform media items on a client device via gesture controls and contextual synchronization. FIG. 5A illustrates an example screenshot of a playlist UI 500 provided to a user viewing the playlist via a media viewer at a client device. The playlist UI includes a header 501 detailing a name, and in some implementations other identifying information, of a playlist generated by a content sharing platform and selected by the user for viewing. A body 502 of playlist UI lists the media items composing the playlist. In one implementation, the user may select one of the media items of the playlist for viewing by touching or tapping 503 the portion of the UI 500 associated with the media item.

FIG. 5B illustrates an example screenshot of the playlist UI 510 subsequent to the user selecting a media item, 'JKL Video', from the playlist for viewing (e.g., at FIG. 5A). Playlist UI 510 includes a header 504, a media item player 505, and tabbed information 506, 507. Header 504 may detail information, such as a title, of the currently playing media item in media item player 505. Media item player 505 may be a video player streaming a media item selected from the playlist for playback from the content sharing platform. Tabbed information may include an 'About' tab 506 and a 'List' tab 507. Playlist UI 510 illustrates the 'About' tab 506 as active and the 'List' tab 507 as inactive. As shown, the 'About' tab 506 may detail additional information about the currently-playing media item in media item player 505, such as a title, a channel, a media item description, metadata associated with the content item (e.g., number of views, etc.), thumbs up and thumbs down options, comments regarding the media item, and so on. A user may touch or tap 508 the 'List' tab 507 to activate that tab for viewing.

Figures 5C, 5D:
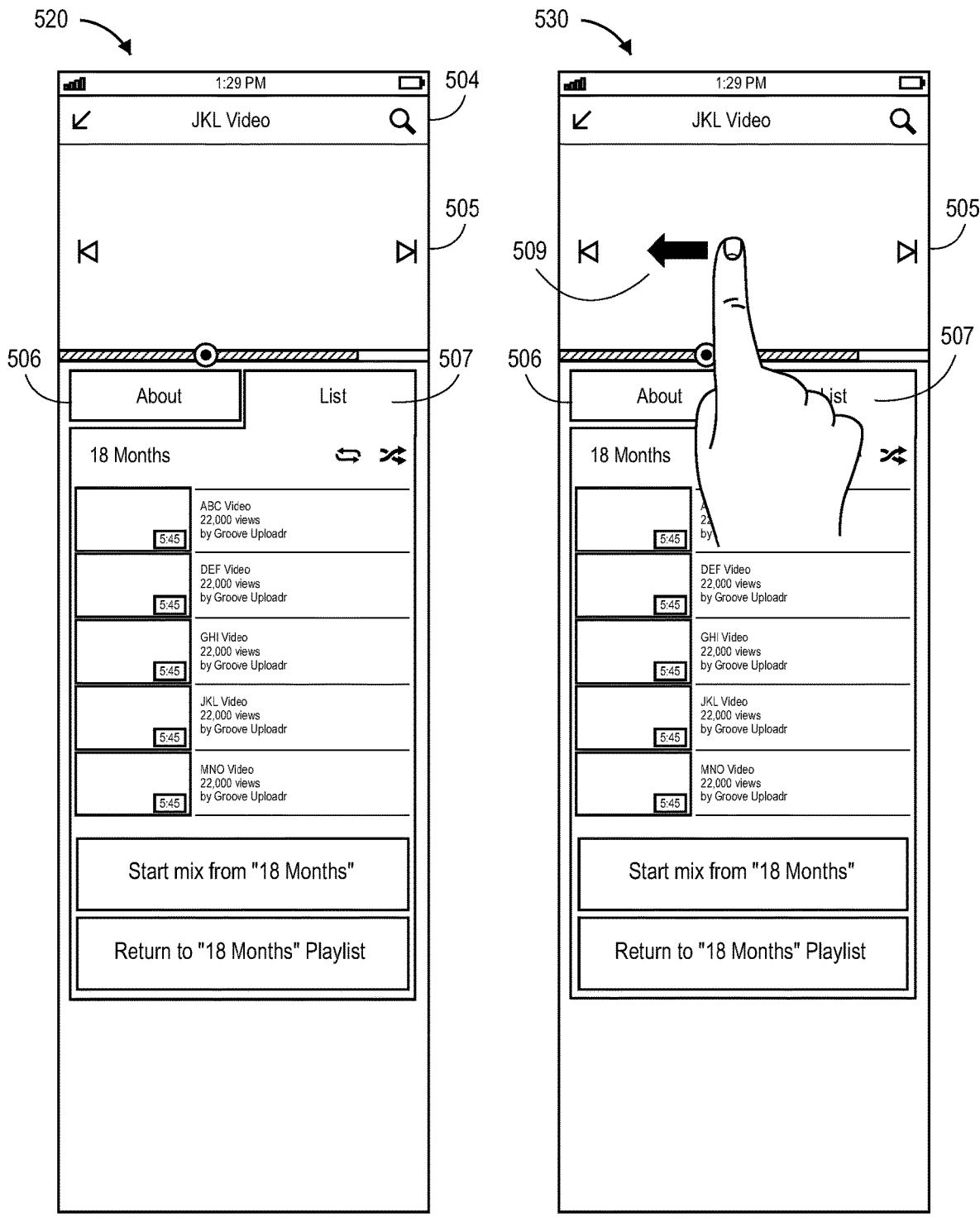

FIG. 5C illustrates an example screenshot of the playlist UI 520 subsequent to the user selecting 508 the 'List' tab 507. As shown in playlist UI 520, the 'List' tab 507 is active and the 'About' tab 506 is inactive. The 'List' tab 507 may list the media items composing the playlist. This listing may be presented in a variety of formats. As shown, the listing includes thumbnails images for each media item of the playlist and associated metadata (e.g., title, number of views, content owner, etc.) of the media item. In addition, the 'List' tab 507 may include buttons to play the playlist or return to a main menu of the playlist, to name a few examples. Other formats of the 'About' tab 506 and the 'List' tab 507 may be implemented, and are not limited to the present examples.

Figure 5E:
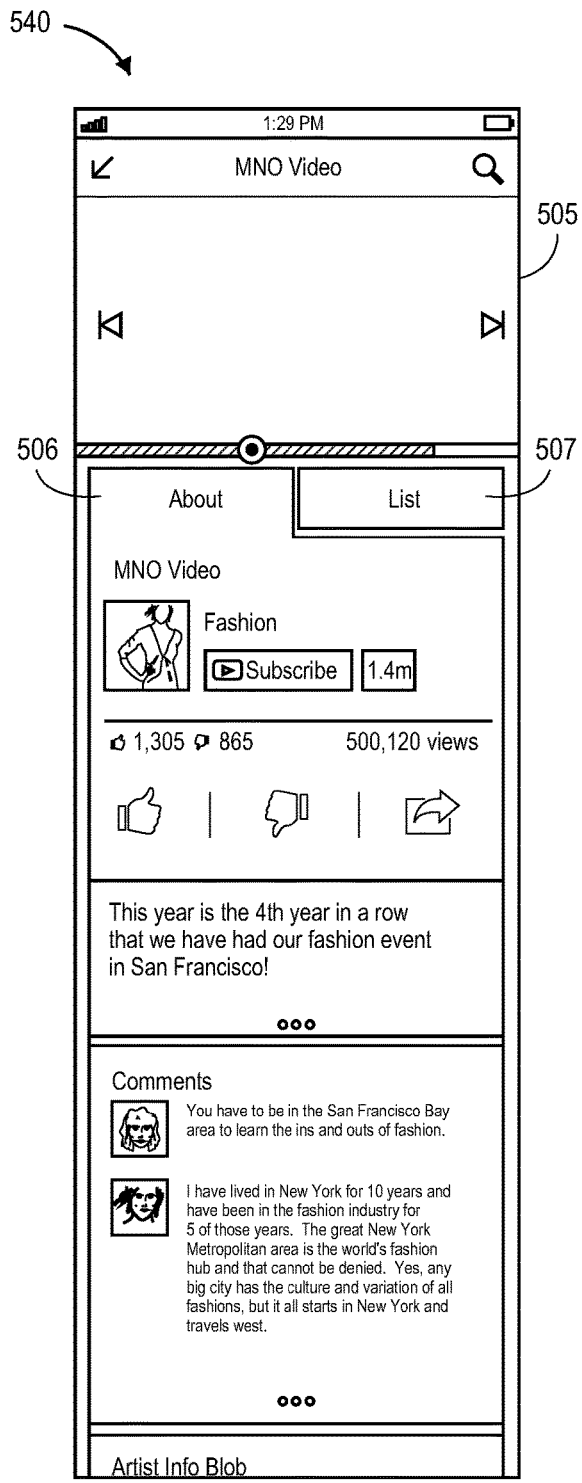

FIG. 5D illustrates an example screenshot of the playlist UI 530 depicting a user gesture applied to the media item player 505 of the playlist UI 530. The user gesture is a swipe left 509 gesture on the media item player 505. FIG. 5E illustrates the playlist UI 540 provided in response to the user gesture 509 in FIG. 5D. In response to the swipe left 509 gesture, the playlist UI 540 proceeds to next media item in the playlist for playback, titled 'MNO Video.' The playlist UI 540 includes the media item player 505 and the information tabs 506, 507 for the currently-playing media item.

Figure 5F:
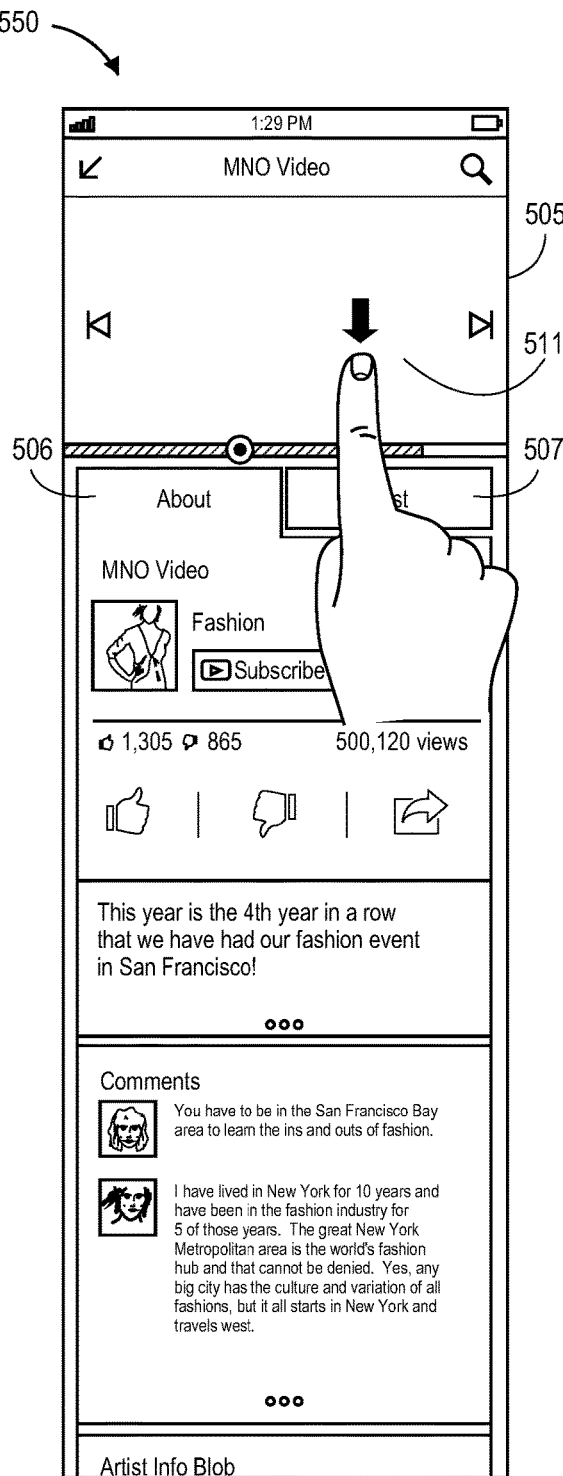
Figure 5G:
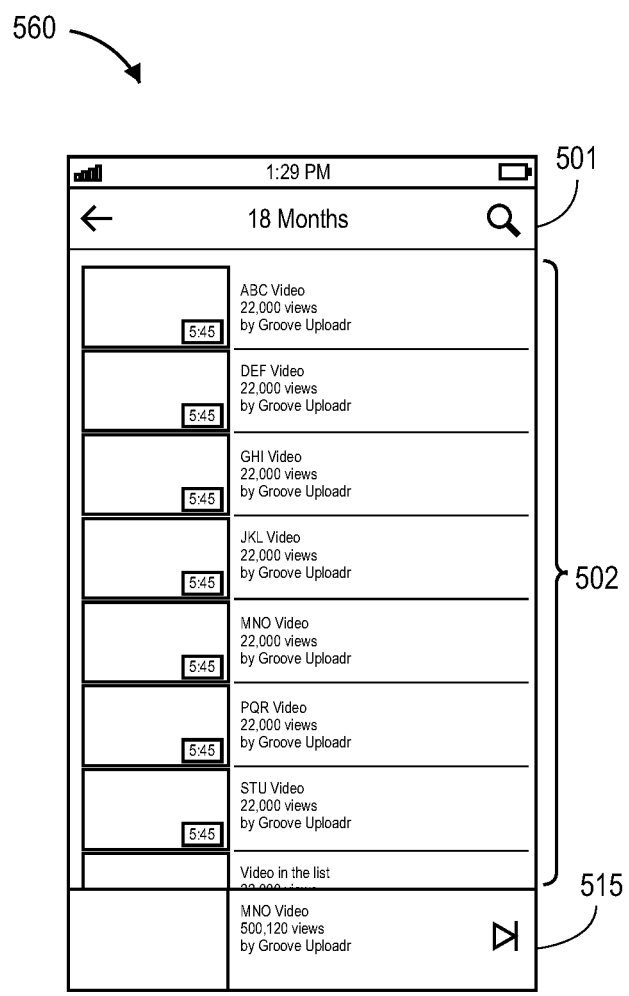

FIG. 5F illustrates an example screenshot of the playlist UI 550 depicting another user gesture applied to the media item player 505 of the playlist UI 550. The user gesture is a swipe down 511 gesture on the media item player 505 portion of the playlist UI 550. FIG. 5G illustrates the playlist UI 560 provided in response to the user gesture 511 in FIG. 5F. In response to the swipe down 511 gesture, the media item player 515 in the playlist UI 560 is minimized to a bottom portion of the playlist UI 560. In one implementation, the list of media items 502 in the playlist is shown in the playlist UI 560 when the media item player 515 is minimized. In implementations of the disclosure, user gestures made in relation to the minimized media item player 515 continue to result in navigation of the list of media items in the playlist.

FIGS. 6A through 6D are example screenshots illustrating different options for placement of a media item player on a playlist UI according to implementations of the disclosure. FIGS. 6A-6D each illustrate an example screenshot of a playlist UI 610-640 including a header 601 and a body 602. The header 601 details a name, and in some implementations other identifying information, of a playlist generated by a content sharing platform and selected by the user for viewing. The body 602 of playlist UI 610-640 lists the media items composing the playlist.

Figures 6C, 6D:
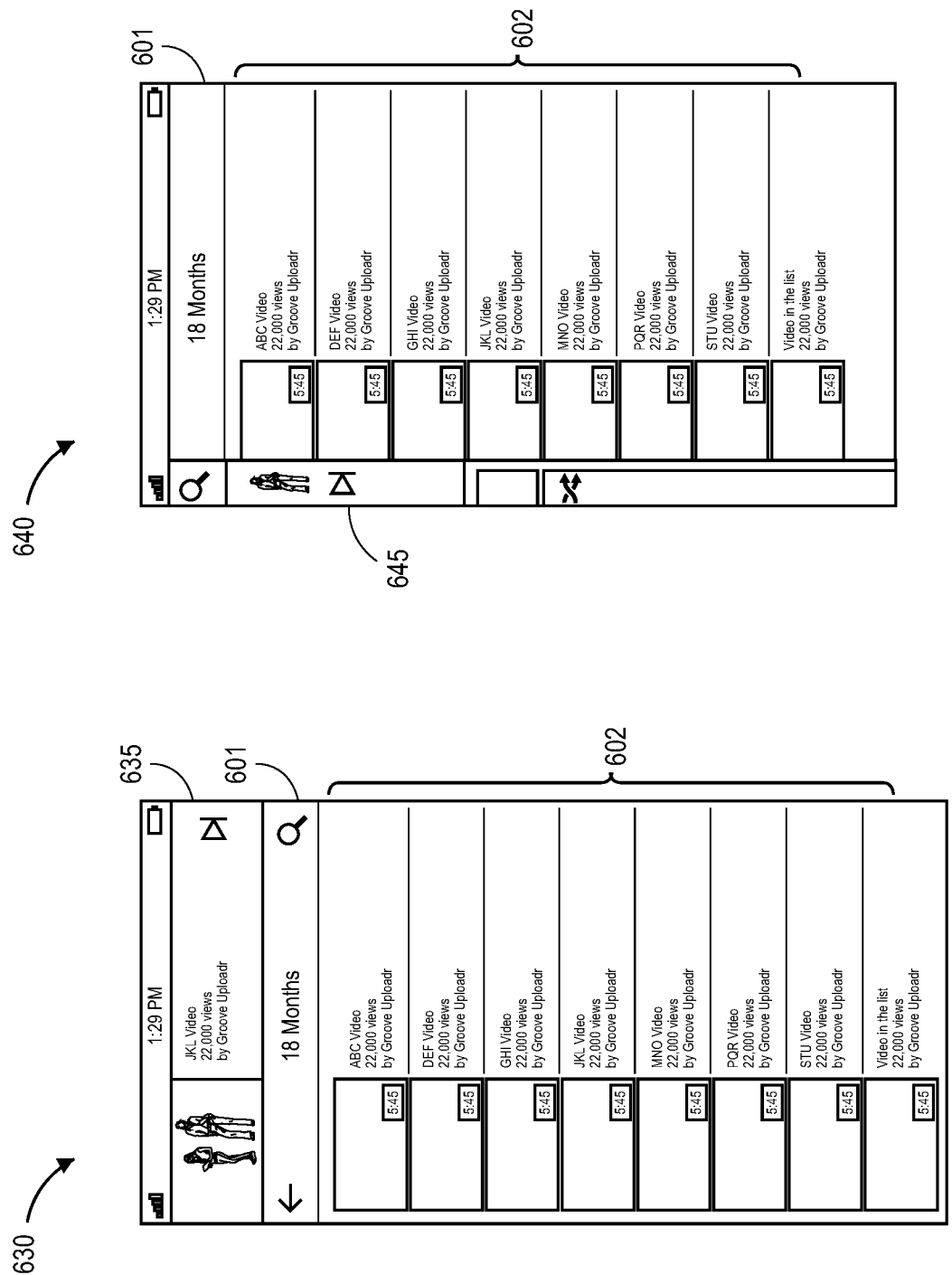

FIG. 6A illustrates a floating media item player 615 according to one implementation of the disclosure. The floating media item player 615 obscures less of the list of media items 602 in the playlist UI 610. FIG. 6B illustrates a "bottom drawer" version of the media item player 625. This bottom drawer media item player 625 provides more visible controls for the media item player in the playlist UI 620. FIG. 6C illustrates the media item player 635 at the top of the playlist UI 630. FIG. 6D illustrates a center view of the media item player 645. The media item player 645 is shown in a sliver at the left side of the playlist UI 640, that can be slid over (e.g., via a user gesture) to place the media item player 645 front and center for viewing purposes. In implementations of the disclosure, user gestures made in relation to the various formats of the media item player 615-645 continue to result in navigation of the list of media items in the playlist, without regard to the location of the media item player 615-645.

Figure 7:
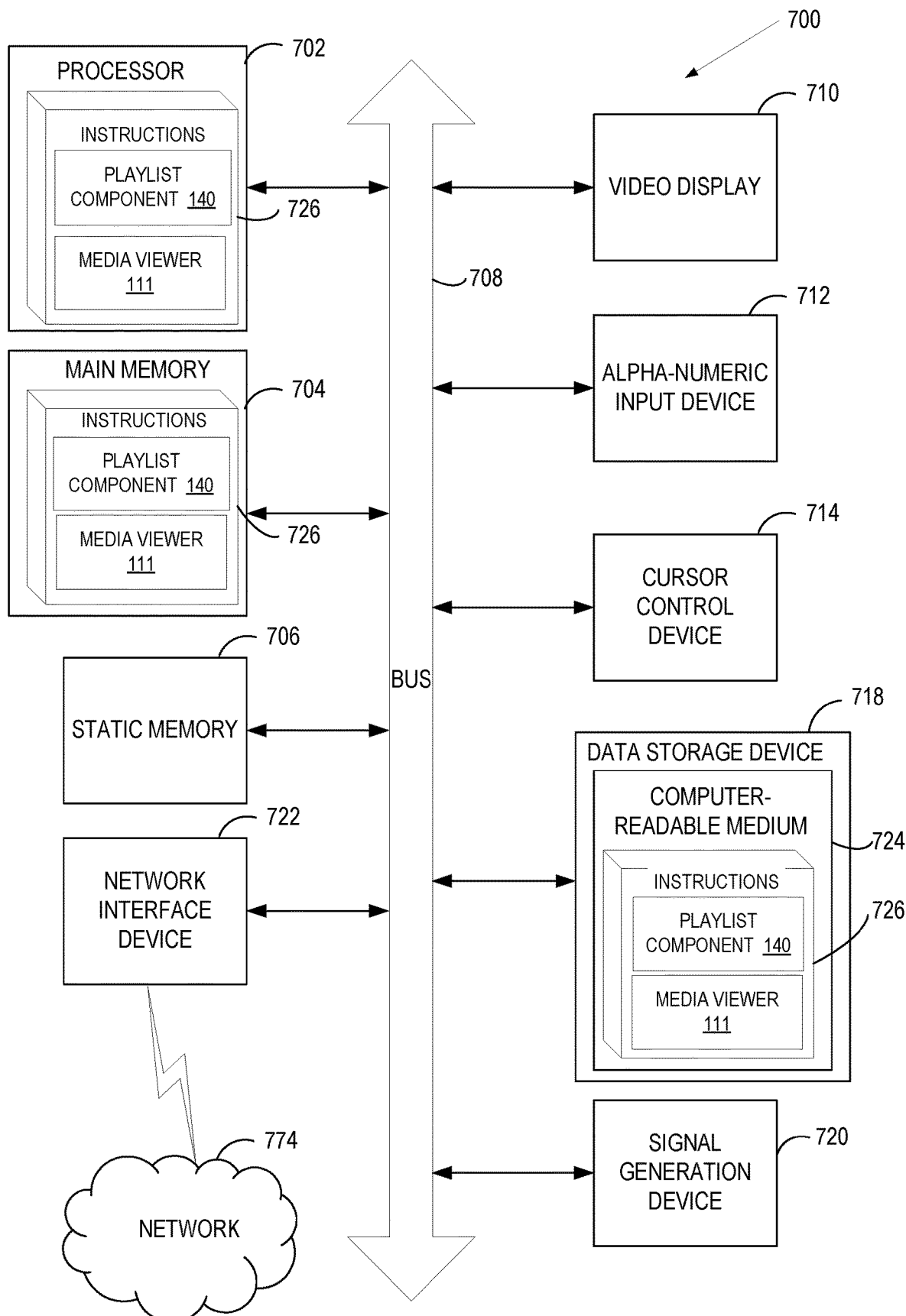
FIG. 7 is a block diagram illustrating an exemplary computer system, according to some implementations.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

In one embodiment, the instructions 726 include instructions for a playlist component 140 and/or a media viewer 111, which may correspond, respectively, to their identically-named counterparts described with respect to FIGS. 1 and 2, and/or a software library containing methods that call a playlist component and/or a media viewer for navigation of a list of content sharing platform media on a user device via gesture controls and contextual synchronization. While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
providing, by an electronic device, a user interface (UI) of an application executed on the electronic device, the UI comprising a playlist portion and a playback portion, wherein the playlist portion of the UI provides a list of media items in a playlist, and wherein the playback portion of the UI provides playback of the playlist, wherein the media items in the playlist are a collection of media items streamable to the application on the electronic device;
receiving an indication of a gesture made by a user of the electronic device with respect to the playlist, the gesture received with respect to the UI while both of the playback portion and the playlist portion are provided on the UI, wherein the gesture comprises at least one of a swipe left gesture, a swipe right gesture, a swipe up gesture, a swipe down gesture, a swipe in a circle gesture, a hover gesture, or a shaking gesture;
identifying a location associated with the gesture on the UI of the application;
determining that the location associated with the gesture is in an area covering the playback portion of the UI while both of the playback portion and the playlist portion are provided on the UI;
in response to determining that the gesture is a swipe left gesture on the identified location, navigating media items of the playlist in a forward direction;
in response to determining that the gesture is a swipe right gesture on the identified location, navigating media items of the playlist in a backward direction; and
updating a viewing state associated with the playlist based on the navigating, the viewing state maintained for the user, wherein gestures of the user received in the playlist portion of the UI provide a different navigational result than gestures made by the user in the playback portion of the UI.

2. The method of claim 1, further comprising receiving a request for the playlist from the user, the request sent via a mobile application of a content sharing platform executing on the electronic device.

3. The method of claim 1, wherein the viewing state associated with the playlist comprises a most recent location within the playlist that the user has viewed, and is used by a content sharing platform to return the user to the most recent location when the user accesses the playlist on a device that is different than the electronic device.

4. The method of claim 1, wherein navigating media items of the playlist in the forward direction comprises at least one of proceeding to a next media item in the playlist, fast forwarding a current media item in the playback, or skipping a promotion in the playback.

5. The method of claim 1, wherein navigating media items of the playlist in the backward direction comprises one of proceeding to a prior media item in the playlist or rewinding a current media item in the playback.

6. The method of claim 1, wherein when the gesture is a swipe up gesture, the navigating the media items comprises one of liking a current media item in the playback, increasing a volume of the playback, increasing a playback speed of the playback, or maximizing a portion of the UI within a display of the application on the electronic device.

7. The method of claim 1, wherein when the gesture is a swipe down gesture, the navigating the media items comprises one of disliking a current media item in the playback, decreasing a volume of the playback, decreasing a playback speed of the playback, or minimizing a portion of the UI within a display of the application on the electronic device.

8. The method of claim 1, wherein when the gesture is a swipe in a circle gesture, the navigating the media items comprises one of returning to a beginning of a current media item in the playback, returning to a first media item in the playlist for the playback, or replaying a section of the current media item in the playback.

9. The method of claim 1, wherein when the gesture is a hover gesture, the navigating the media items comprises one of showing a list of thumbnails and links to each media item in the playlist, or showing other hidden controls for the playlist.

10. The method of claim 1, wherein when the gesture is a shaking gesture, the navigating the media items comprises proceeding to a media item that is randomly-selected from the playlist.

11. A non-transitory machine-readable storage medium storing instructions which, when executed, cause a processing device to perform operations comprising:
receiving, by the processing device of an electronic device, data of a playlist comprising a collection of media items of a content sharing platform, the media items of the playlist streamable to an application executed by the processing device on the electronic device;
generating a user interface (UI) of the application for the playlist, the UI comprising a playlist portion and a playback portion, wherein the playlist portion of the UI provides a list of media items in a playlist, and wherein the playback portion of the UI provides playback of the playlist;
receiving an indication of a gesture made by a user of the electronic device with respect to the playback portion of the UI, the gesture received with respect to the UI while both of the playback portion and the playlist portion are provided on the UI, wherein the gesture comprises at least one of a swipe left gesture, a swipe right gesture, a swipe up gesture, a swipe down gesture, a swipe in a circle gesture, a hover gesture, or a shaking gesture;
identifying a location associated with the gesture on the UI of the application;
determining that the location associated with the gesture is in an area covering the playback portion of the UI while both of the playback portion and the playlist portion are provided on the UI;
in response to determining that the gesture is a swipe left gesture on the identified location, navigating the media items of the playlist in a forward direction;
in response to determining that the gesture is a swipe right gesture on the identified location, navigating the media items of the playlist in a backward direction; and
updating a viewing state associated with the playlist based on the navigating, the viewing state maintained for the user, wherein gestures of the user received in the playlist portion of the UI provide a different navigational result than gestures made by the user in the playback portion of the UI.

12. The non-transitory machine-readable storage medium of claim 11, wherein navigating the media items of the playlist in a forward direction comprises one of proceeding to a next media item in the playlist, fast forwarding a current media item in the playback, or skipping a promotion in the playback, and wherein navigating the media items of the playlist in a backward direction comprises one of proceeding to a prior media item in the playlist or rewinding a current media item in the playback.

13. The non-transitory machine-readable storage medium of claim 11, wherein when the gesture is a swipe up gesture, the navigating the media items comprises one of liking a current media item in the playback, increasing a volume of the playback, increasing a playback speed of the playback, or maximizing a portion of the UI within a display of the application on the electronic device, and wherein when the gesture is a swipe down gesture, the navigating the media items comprises one of disliking a current media item in the playback, decreasing a volume of the playback, decreasing a playback speed of the playback, or minimizing the portion of the UI within the display of the application on the electronic device.

14. The non-transitory machine-readable storage medium of claim 11, wherein when the gesture is a swipe in a circle gesture, the navigating the media items comprises one of returning to a beginning of a current media item in the playback, returning to a first media item in the playlist for the playback, or replaying a section of the current media item in the playback, wherein when the gesture is a hover gesture, the navigating the media items comprises one of showing a list of thumbnails and links to each media item in the playlist, or showing other hidden controls for the playlist, and wherein when the gesture is a shaking gesture, the navigating the media items comprises proceeding to a media item that is randomly-selected from the playlist.

15. A system comprising:
a memory to store a plurality of media items; and
a processing device communicably coupled to the memory, the processing device to:
provide a user interface (UI) of an application executed on the electronic device, the UI comprising a playlist portion and a playback portion, wherein the playlist portion of the UI provides a list of media items in a playlist, and wherein the playback portion of the UI provides playback of the playlist, wherein the media items in the playlist are a collection of media items streamable to the application on the electronic device;
receive an indication of a gesture made by a user of the electronic device with respect to the playlist, the gesture received with respect to the UI while both of the playback portion and the playlist portion are provided on the UI, wherein the gesture comprises at least one of a swipe left gesture, a swipe right gesture, a swipe up gesture, a swipe down gesture, a swipe in a circle gesture, a hover gesture, or a shaking gesture;
identify a location associated with the gesture on the UI of the application;
determine that the location associated with the gesture is in an area covering the playback portion of the UI while both of the playback portion and the playlist portion are provided on the UI;
in response to determining that the gesture is a swipe left gesture on the identified location, navigate media items of the playlist in a forward direction;
in response to determining that the gesture is a swipe right gesture on the identified location, navigate media items of the playlist in a backward direction; and
update a viewing state associated with the playlist based on the navigating, the viewing state maintained for the user, wherein gestures of the user received in the playlist portion of the UI provide a different navigational result than gestures made by the user in the playback portion of the UI.

16. The system of claim 15, wherein:
the processing device to navigate media items of the playlist in the forward direction comprises one of proceeding to a next media item in the playlist, fast forwarding a current media item in the playback, or skipping a promotion in the playback;
the processing device to navigate media items of the playlist backward direction comprises one of proceeding to a prior media item in the playlist or rewinding a current media item in the playback;
responsive to the gesture comprising a swipe up gesture, the processing device to at least one of like a current media item in the playback, increase a volume of the playback, increase a playback speed of the playback, or maximize a portion of the UI within a display of the application on the electronic device; and
responsive to the gesture comprising a swipe down gesture, the processing device to at least one of dislike a current media item in the playback, decrease a volume of the playback, decrease a playback speed of the playback, or minimize the portion of the UI within the display of the application on the electronic device.

17. The system of claim 15, wherein:
responsive to the gesture comprising a swipe in a circle gesture, the processing device to at least one of return to a beginning of a current media item in the playback, return to a first media item in the playlist for the playback, or replay a section of the current media item in the playback;
responsive to the gesture comprising a hover gesture, the processing device to at least one of show a list of thumbnails and links to each media item in the playlist, or show other hidden controls for the playlist; and
responsive to the gesture comprises a shaking gesture, the processing device to proceed to a media item that is randomly-selected from the playlist.

* * * * *